C. H. FUHRMANN.
KITCHEN RACK.
APPLICATION FILED JAN. 15, 1918.
1,266,245.
Patented May 14, 1918.
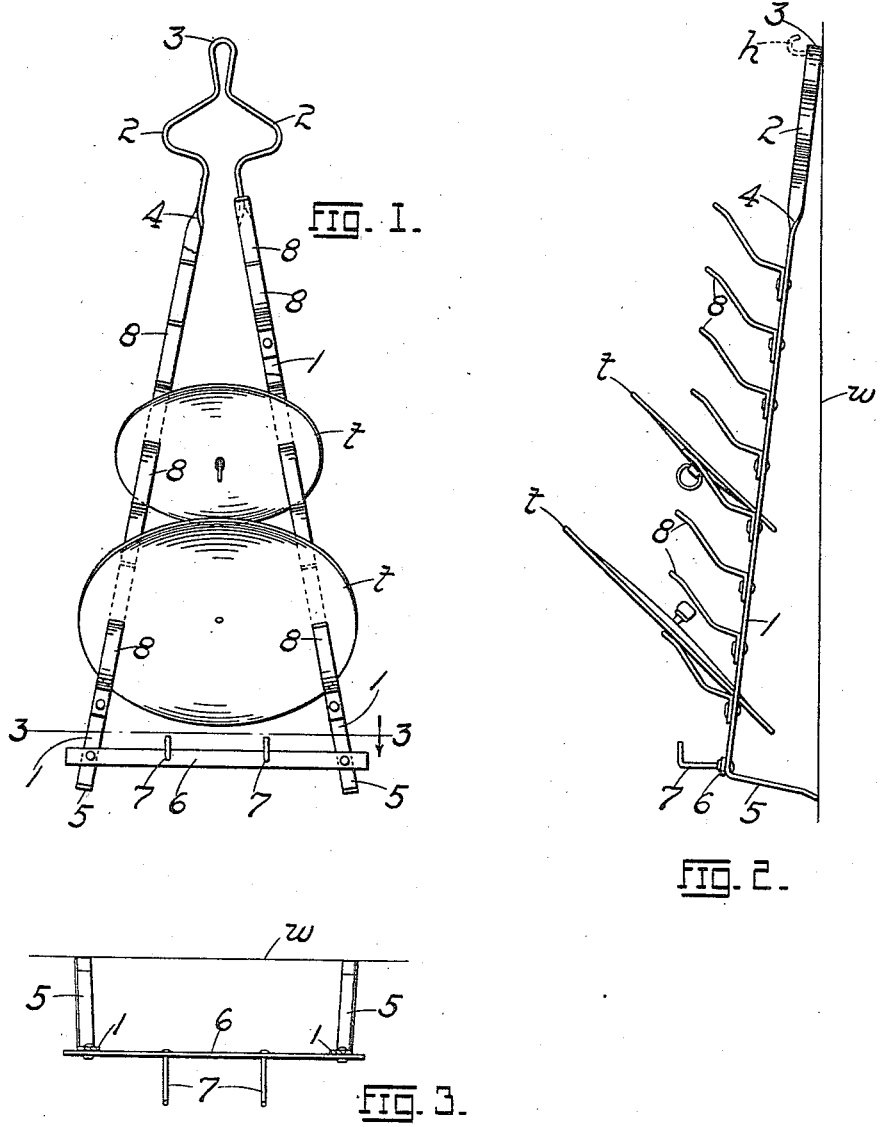

UNITED STATES PATENT OFFICE.

CURT H. FUHRMANN, OF ST. LOUIS, MISSOURI.

KITCHEN-RACK.

1,266,245.

Specification of Letters Patent.

Patented May 14, 1918.

Application filed January 15, 1918. Serial No. 211,932.

*To all whom it may concern:*

Be it known that I, CURT H. FUHRMANN, a citizen of the United States, residing at St. Louis, State of Missouri, have invented certain new and useful Improvements in Kitchen-Racks, of which the following is a full, clear, and exact description, reference being had to the accompanying drawings, forming a part hereof.

The present invention is directed to improvements in kitchen racks, and particularly to racks for supporting lids of cooking vessels, the object sought being to provide a rack which shall be light, strong, durable; one capable of supporting lids of various sizes; one occupying a minimum space; and one possessing further and other advantages better apparent from the following detailed description, in connection with the accompanying drawing—

Figure 1 represents a front elevation of the rack; Fig. 2 is a side elevation thereof; and Fig. 3 is a horizontal section on the line 3—3 of Fig. 1.

The rack comprises a triangular frame or body portion made of a strip of sheet metal, said frame comprising the upwardly converging side portions 1, 1, the flat faces whereof are disposed in the general plane of the frame, the converging terminals of the said side portions springing from the intermediate lateral bends 2, 2, which in turn terminate in a loop 3 forming the middle bend of the original strip of metal from which the parts 1, 2 and 3 are formed. The flat sides of the portions 2 and 3 are disposed at right angles to the general plane of the rack, that is to say, at right angles to the plane of the faces of the side members 1, 1. This is brought about by imparting to the metal a twist 4 at points contiguous to the converging terminals of the side members 1, 1, said twist not only imparting stiffness to the parts, but permitting the parts 2 and 3 to be disposed in such a way as to make it convenient to suspend the rack from a hook $h$ passed through the eye or loop 3. The lower ends of the side members 1, 1, terminate in rearwardly directed feet 5, said feet being of a length such that when bearing against the wall $w$ from which the rack is suspended, the same will impart to the rack a slight inclination to the vertical plane of the wall. The parts of the frame thus far described are integral being made of a single strip of sheet metal the middle point of which is at the bend forming the suspending eye or loop 3. The bases of the sides 1, 1, are connected by the bottom horizontal strip 6 which is riveted to said members 1, 1, the said bottom strip being provided with a plurality of hooks 7 for hanging various kitchen articles to which such hooks are adapted.

Disposed along the side members 1, 1, are series of bent fingers or brackets 8, 8, the same being in transverse alinement, so that a pair of such brackets may be availed of to support a lid $t$, the larger lids being deposited on the more widely spaced fingers, and the smaller lids on the upper or higher sets of fingers which are closer together as obvious from the drawings. The fingers 8 are likewise made of strips of sheet metal, their fixed ends being preferably riveted to the side members 1, 1, as shown, the several lid-supporting pairs of fingers being disposed preferably uniform distances apart along the members 1, 1. The said fingers being formed of sheet metal are resilient and eminently adapted for supporting the lids of china and glass vessels without danger of injury or chipping as a result of careless handling and forcible knocking against the fingers. The fingers have preferably imparted to them a reverse curve so that the convex portion of the finger will engage the article supported thereby as clearly apparent from the drawing. The feet 5 are of such a length as to tilt the rack far enough from the supporting wall $w$ to prevent the largest lids or other articles supported by the fingers from coming in contact with the wall (Fig. 2). I may of course depart in a measure from the details here shown without in any wise affecting the nature or spirit of the invention.

Having described my invention what I claim is—

A rack of the character described comprising a triangular frame composed of strip sheet metal, said frame having upwardly converging side members with faces disposed in the general plane of the rack, lateral bends at the convergence of the sides with flat faces disposed at right angles to the faces of the side members, a twist being formed in the strip for connecting the side members to the bends aforesaid, a loop extension leading from the bends aforesaid, and series of resilient fingers carried by the side members and disposed in transverse alinement for supporting the articles deposited thereon.

In testimony whereof I affix my signature in presence of two witnesses.

CURT H. FUHRMANN.

Witnesses:
EMIL STAREK,
ELSE M. SIEGEL,